United States Patent [19]
McWhorter et al.

[11] Patent Number: 5,308,094
[45] Date of Patent: May 3, 1994

[54] TRANSPORT APPARATUS

[76] Inventors: Clyde C. McWhorter; Lynne C. McWhorter, both of 6807 Glen Ridge Dr., Austin, Tex. 78731

[21] Appl. No.: 99,532
[22] Filed: Jul. 30, 1993
[51] Int. Cl.$^5$ ............................................. B62B 1/14
[52] U.S. Cl. ........................ 280/43.17; 280/43.24; 269/17
[58] Field of Search ............... 280/30, 43.17, 47.24, 280/47.33, 47.131, 43.24; 269/17

[56] References Cited
U.S. PATENT DOCUMENTS

| | | | |
|---|---|---|---|
| 1,171,886 | 2/1916 | Ray | 280/43.17 |
| 3,422,929 | 1/1969 | Oja et al. | 280/43.17 |
| 4,230,329 | 10/1980 | Johnson | 280/43.17 |
| 4,417,738 | 11/1983 | Kendall | 280/43.17 |
| 4,921,262 | 5/1990 | Svitak | 280/43.17 X |

Primary Examiner—Margaret A. Focarino
Assistant Examiner—Carla Mattix
Attorney, Agent, or Firm—Leon Gilden

[57] ABSTRACT

A transport apparatus is arranged to include a platform pivotally mounted relative to and within the legs of a table structure, whereupon the platform includes lever apparatus to cantilever the platform and project wheel members of the platform to engagement to an underlying support surface to permit rolling support of the table structure.

3 Claims, 5 Drawing Sheets

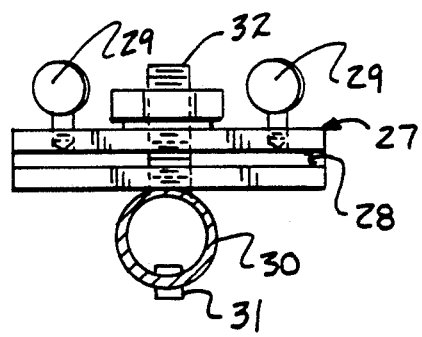
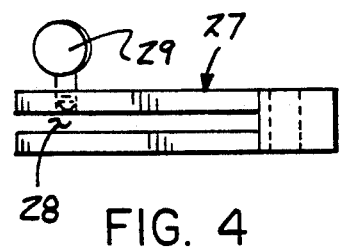
FIG. 3   FIG. 4
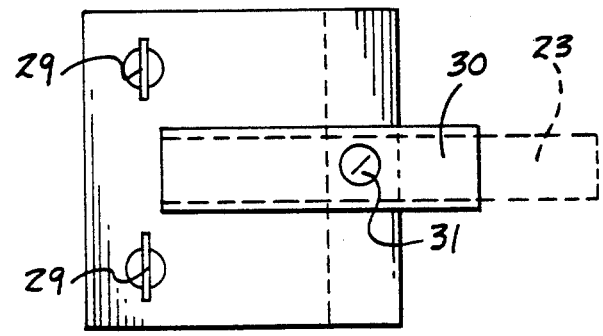
FIG. 5
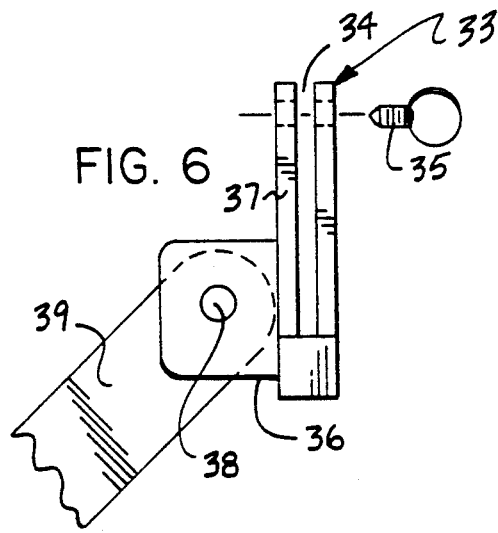
FIG. 6
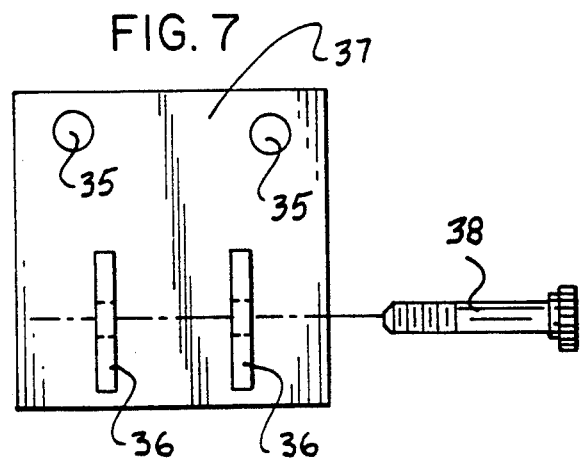
FIG. 7

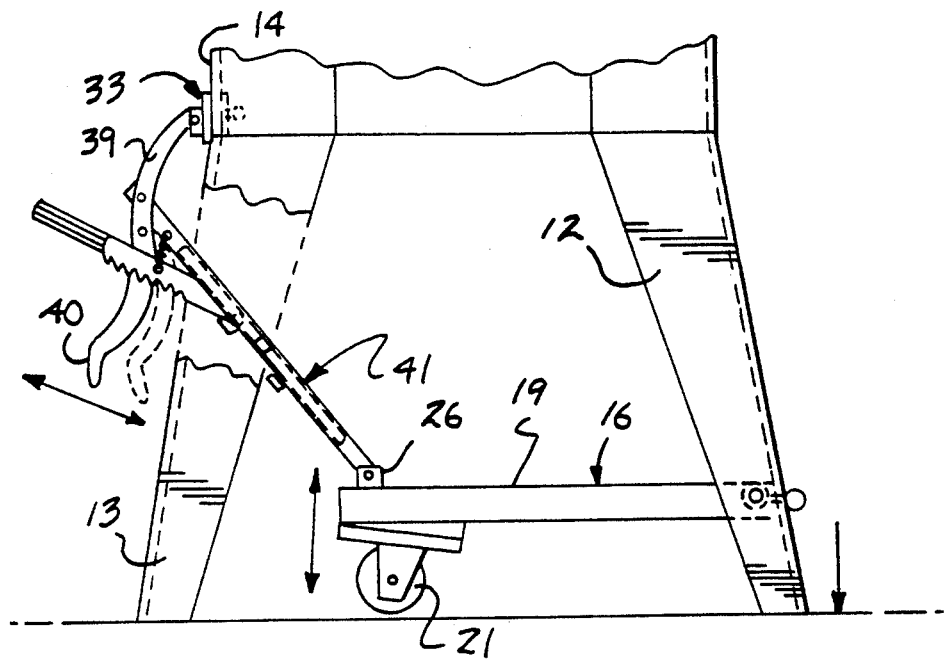
FIG. 10
FIG. 11
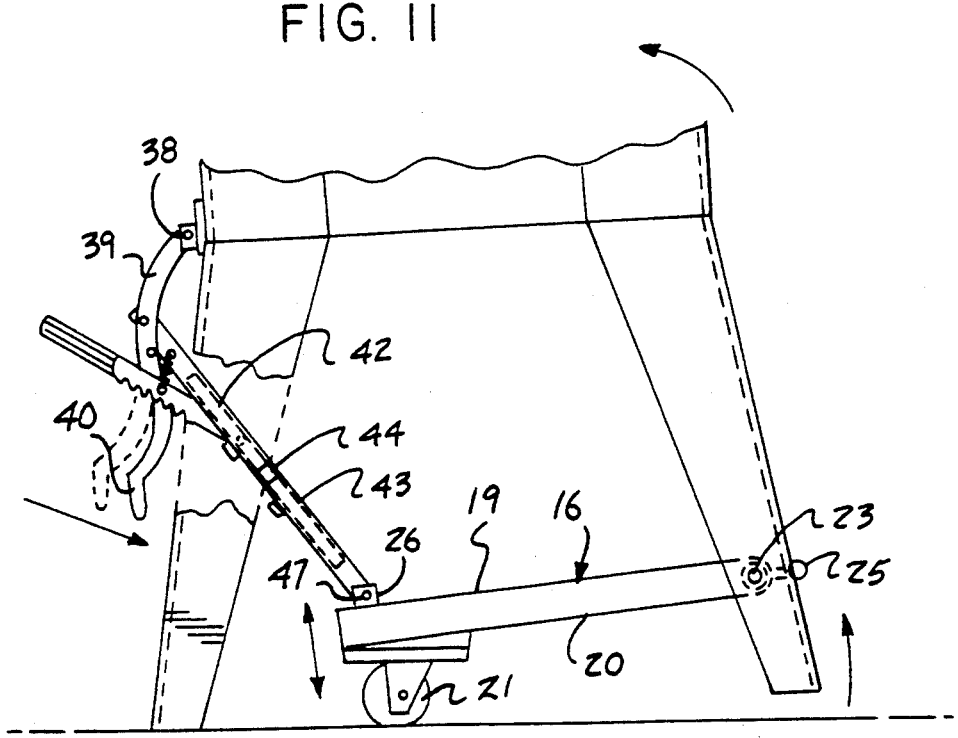

TRANSPORT APPARATUS

BACKGROUND OF THE INVENTION

1. Field of the Invention

The field of invention relates to transport structure, and more particularly pertains to a new and improved transport apparatus arranged to provide for the mobility of a support table.

2. Description of the Prior Art

Various transport apparatus such as dollies and the like are indicated in the prior art by the U.S. Pat. Nos. 4,846,485; 4,088,337; 3,913,763; 4,277,075; and 3,735,996.

The instant invention attempts to overcome deficiencies of the prior art by providing for a transport platform or dolly structure mounted relative to a table permitting pivoting of the dolly relative to the table providing cantilevered support of forward legs of the dolly and in this respect, the present invention substantially fulfills this need.

SUMMARY OF THE INVENTION

In view of the foregoing disadvantages inherent in the known types of transport apparatus now present in the prior art, the present invention provides a transport apparatus employing a dolly member pivotally mounted below a table within the table legs. As such, the general purpose of the present invention, 7hich will be described subsequently in greater detail, is to provide a new and improved transport apparatus which has all the advantages of the prior art transport apparatus and none of the disadvantages.

To attain this, the present invention provides a transport apparatus arranged to include a platform pivotally mounted relative to and within the legs of a table structure, whereupon the platform includes lever apparatus to cantilever the platform and project wheel members of the platform to engagement to an underlying support surface to permit rolling support of the table structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved transport apparatus which has all the advantages of the prior art transport apparatus and none of the disadvantages.

It is another object of the present invention to provide a new and improved transport apparatus which may be easily and efficiently manufactured and marketed.

It is a further object of the present invention to provide a new and improved transport apparatus which is of a durable and reliable construction.

An even further object of the present invention is to provide a new and improved transport apparatus which is susceptible of a low cost of manufacture with regard to both materials and labor, and which accordingly is then susceptible of low prices of sale to the consuming public, thereby making such transport apparatus economically available to the buying public.

Still yet another object of the present invention is to provide a new and improved transport apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. F/r a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the table leg clamp structure.

FIG. 4 is an orthographic side view of the table leg clamp structure without the associated support tube.

FIG. 5 is an orthographic top view of the table leg clamp structure.

FIG. 6 is an orthographic side view of the table skirt clamping structure.

FIG. 7 is an orthographic frontal view of the table skirt clamping structure.

FIG. 10 is an orthographic side view of the linkage structure in use.

FIG. 11 is an orthographic side view of the linkage structure projecting the dolly towards an underlying surface to effect lifting of forward legs of the associated support table.

DESCRIPTION OF THE PREFERRED EMBODIMENT

Figure 1:
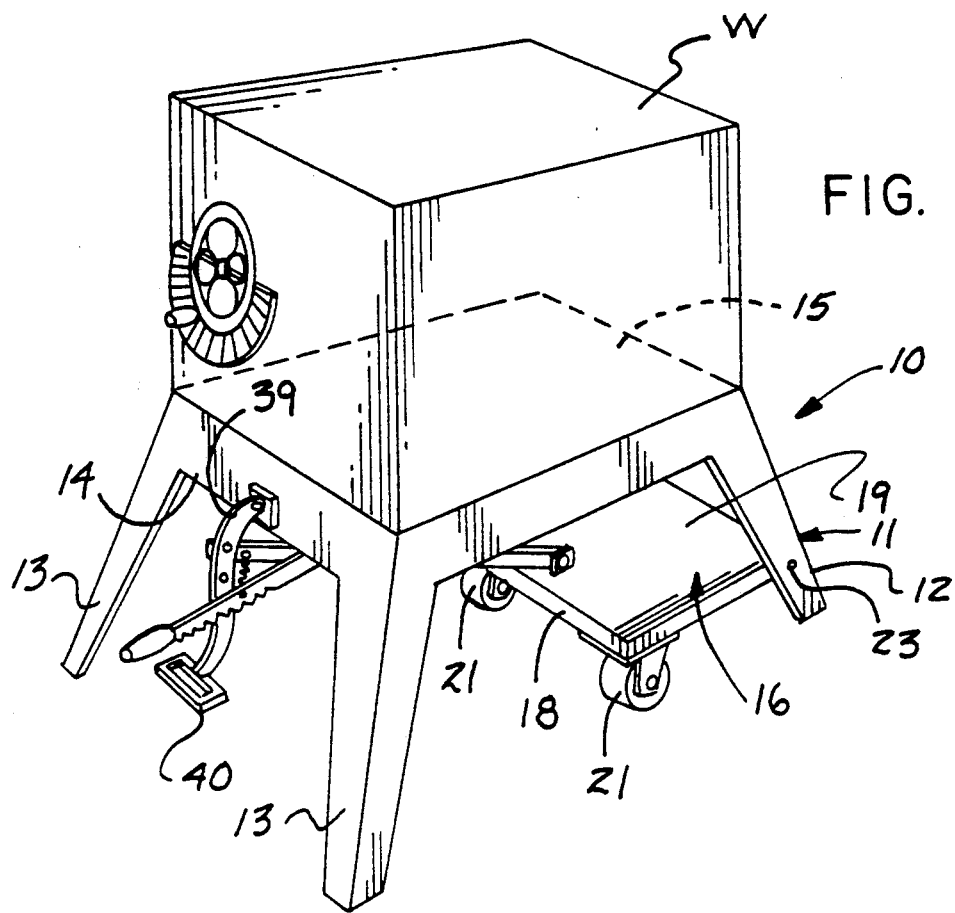
FIG. 1 is an isometric illustration of the invention in use.

With reference now to the drawings, and in particular to FIGS. 1 to 13 thereof, a new and improved transport apparatus embodying the principles and concepts of the present invention and generally designated by the reference numeral 10 will be described.

Figure 2:
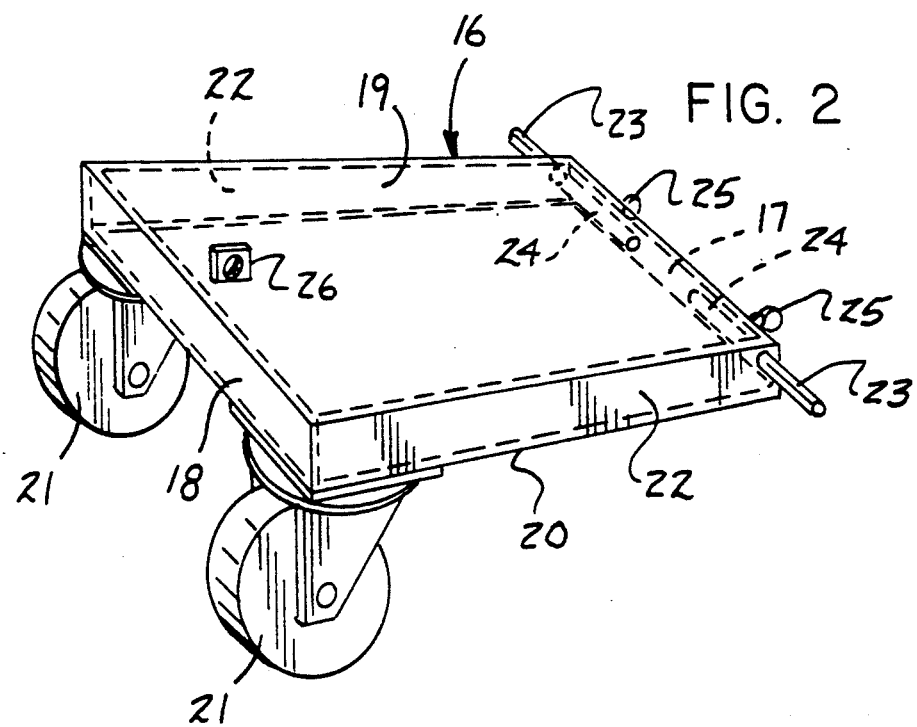
FIG. 2 is an isometric illustration of a dolly structure.
Figure 8:
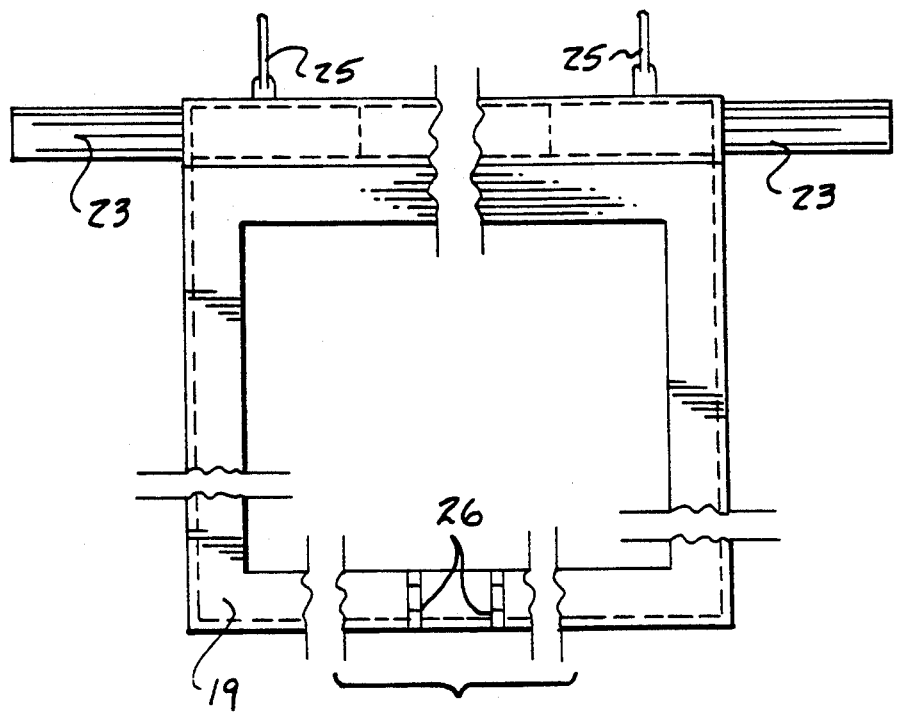
FIG. 8 is an orthographic top view of the dolly structure.
Figure 9:
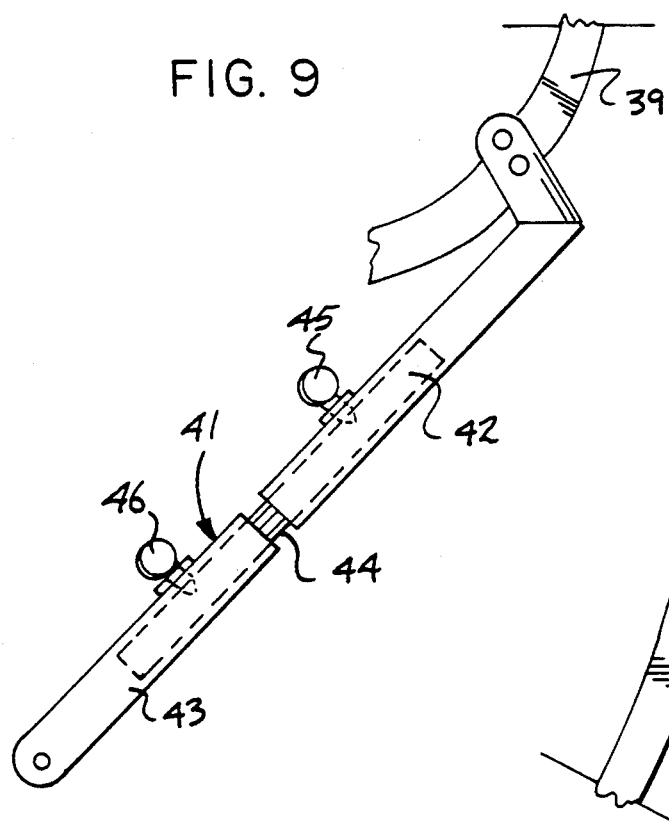
FIG. 9 is an orthographic side view of the lever plate in cooperation with the actuator link.
Figure 9A:
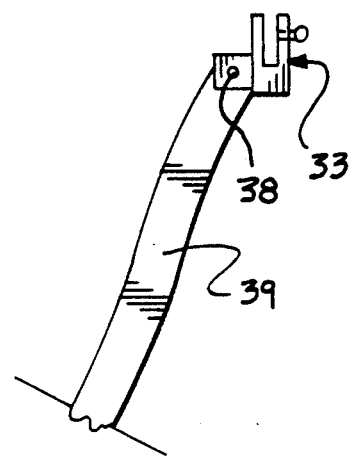
FIG. 9a is an orthographic side view of the lever plate mounted and associated with the side wall clamp structure.
Figure 12:
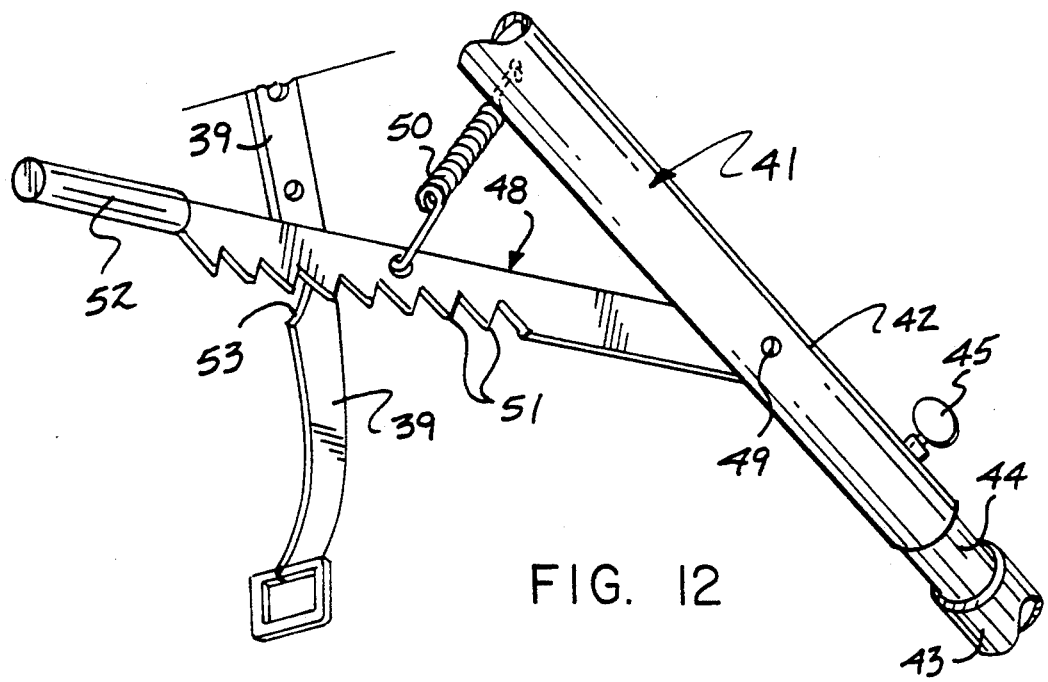
FIG. 12 is an isometric illustration of the linkage structure.
Figure 13:
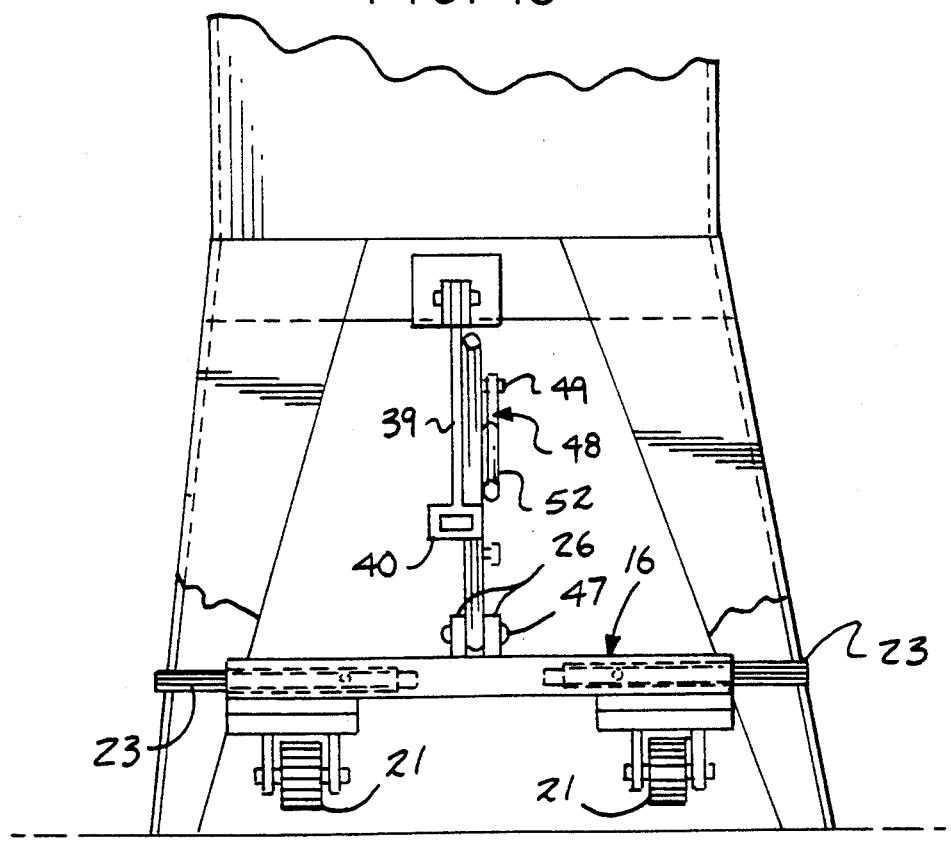
FIG. 13 is an orthographic end view of the dolly structure mounted within the table.

More specifically, the transport apparatus 10 of the instant invention essentially comprises a table member 11 arranged to accommodate a workpiece "W" thereon, wherein the table member includes a plurality of forward table legs 12 spaced from rear table legs 13. The table member 11 includes a table support top plate 15, with a table side wall flange 14 extending therefrom in a downwardly extending perimeter relationship relative to the top plate 15. A carriage plate 16, or dolly, is positioned below the top plate 15. The carriage plate 16 includes a forward end wall 17 spaced from a rear end wall 18, a carriage plate top wall 19 spaced from a carriage plate bottom wall 20, with the carriage plate including carriage plate side walls 22. Spaced caster wheels 21 are mounted to the carriage plate bottom wall 20 in adjacency to the rear end wall 18, as illustrated in FIG. 2, with one of the caster wheels positioned typically adjacent one of the side walls 22. Projecting orthogonally relative to each of the side walls 22 is a carriage plate axle 23 positioned in adjacency to the carriage plate &/rward end wall 17. Each of the carriage plate axles 23 are received within a respective axle bore 24, with the carriage plate axles 23 linearly aligned relative to one another. An axle fastener 25 directed threadedly through the forward end wall 17 intersects the respective axle bore 24 to capture and secure a respective carriage plate axle 23 therewithin in an adjustable relationship. As illustrated, the carriage plate axles 23 may extend pivotally through one of the forward table legs 12 permitting pivoting of the carriage plate relative to the table member 11.

The FIGS. 3-5 indicate the optional employment of a table leg clamp 27, having a table leg clamp receiving slot 28 to receive an associated table leg therewithin, with a plurality of table leg slot fasteners 29 directed through the table leg clamp 27 intersecting the table leg receiving slot 28 to secure an associated table leg 12 therewithin. An axle receiving tube 30 is mounted to the table leg clamp 27 by means of a tube boss 32, wherein an axle receiving tube fastener 31 directed into the axle receiving tube 30 is arranged to secure an associated axle 23 received therewithin, in a manner as indicated in phantom in FIG. 5, upon securing an associated table leg clamp 27 to one of the table legs 12.

As illustrated in FIG. 1 and in FIG. 6, a table side wall clamp 33 is provided. The side wall clamp 33 is arranged to secure articulated linkage in cooperation relative to the table side wall 14 medially of the rear table legs 13. The side wall clamp 33 includes a side wall clamp receiving slot 34 to receive the side wall therewithin, wherein a side wall fastener 35 threadedly directed through the side wall clamp and the receiving slot 34 is directed through the table leg side wall flange 14 to secure the table side wall clamp 33. The linkage accordingly extends from the side wall clamp 33 to an associated mounting flange 26 orthogonally mounted to the carriage plate top wall 19 intermediate the side walls 22.

A side wall clamp 33 having clamp boss plate 36 projecting parallel relative to one another and orthogonally relative to the side wall clamp 33 is provided. A lever plate 39 is provided, having a lever plate first end received between the clamp boss plates 36 that are in turn mounted to the side wall clamp 33 front wall 37, with a lever axle 38 extending orthogonally through the clamp boss plates 36 and the lever plate 39 first end. A lever plate pedal flange 40 is mounted to the lever plate second end, in a manner as illustrated in FIG. 1. An actuator link 41 is provided (see FIG. 10 for example), wherein the actuator link includes a first leg tube 42 spaced from a second leg tube 43, having a central rod 44 slidably received within the first and second leg tubes 42 and 43 respectively, with first and second actuator link fasteners 45 and 46 threadedly directed into the first and second leg tubes 42 and 43 to engage a central rod 44 to provide for adjustment of effective length of the actuator link 41. A second actuator link leg tube axle 47 pivotally mounts the second leg tube 43 intermediate the mounting flanges 26, with a first tube axle 47a pivotally mounting the actuator link first leg tube 42 to the lever plate 39, as illustrated in FIG. 10 for example.

A securement leg 48 is provided, having a first end axle 49 pivotally mounting the securement leg first end about the actuator link first leg tube 42, with a securement leg spring 50 mounted between the securement leg and the actuator link first leg tube 42. The securement leg 48 includes a row of engaging teeth 51 arranged to engage a lever plate engaging flange 53 mounted fixedly to the lever plate 39 extending laterally thereof, with the engaging flange 53 oriented between a plurality of the engaging teeth 51, with the engaging flange 53 maintained by means of pressure to the teeth when the lever plate 39 is rotated to project the actuator link 41 to extend the carriage plate 16 to an underlying support surface and effect lifting of the forward legs 12 of the table 11. A securement leg handle 52 effects ease of separation of the teeth relative to the flange 53 to disengage and permit lifting of the carriage plate relative to the first position, as illustrated in FIG. 10, from the second position, as illustrated in FIG. 11.

Accordingly, projection of the linkage to the second position, as illustrated in FIG. 11, permits lifting of the table member forward legs 12 permitting a handcart type usage of the table and transport of the associated workpiece "W".

It should be further noted that the spring 50 is of tension to displace and dislodge the teeth 51 from the flange 53. Further if desired, a spring may be directed from the securement leg 48 to the second tube 43 of greater strength than the spring 50 to enhance securement of the associated securement leg 48 to the engaging flange 53.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A transport apparatus, comprising,
    a table member, the table member including a plurality of forward legs spaced from a plurality of rear legs, and the table member including a table support top plate, with the top plate having a side wall flange extending at least between the rear table legs, and
    a carriage plate, the carriage plate positioned below the table support top plate and including a carriage plate forward end wall spaced from a carriage plate rear end wall, a carriage plate top wall spaced from a carriage plate bottom wall, and carriage plate side walls, with a plurality of caster wheels mounted to the carriage plate bottom wall in adjacency to the carriage plate rear end wall, with each carriage plate side wall including an axle, each said axle linearly aligned relative to one another, and each said axle pivotally mounted within one of said forward table legs, and
    a mounting flange orthogonally and fixedly mounted to the carriage plate top wall in adjacency to the carriage plate rear end wall, 7ith linkage means extending between the table side wall flange and the mounting flange to effect displacement of the caster wheels from a first position spaced from an underlying support to a second position in engagement with an underlying support, and
    the linkage means includes a table side wall clamp, the table side wall clamp includes a side wall clamp receiving slot receiving said table side wall flange therewithin, and a table side wall clamp fastener directed through said table side wall clamp into said table side wall clamp receiving slot, and the table side wall clamp having a plurality of spaced clamp boss plates and a clamp front wall, with the clamp boss plates mounted to said clamp front wall, and a lever plate, the lever plate including a lever plate first end spaced from a lever plate second end, the lever plate first end including a lever axle directed through said lever plate adjacent said lever plate first end and orthogonally through said clamp boss plates, said lever plate second end including a pedal flange to permit ease of projection and pivoting of the lever plate about said lever axle, and an actuator link extending from said lever plate intermediate said lever plate first end and said lever plate second end, with the actuator link extending pivotally to said mounting flange from said lever plate, whereupon pivoting of said lever plate effects projection of said carriage plate to said underlying support surface.

2. An apparatus as set forth in claim 1 wherein said actuator link includes a first leg tube and a second leg tube, the first leg tube and the second leg tube include a central rod slidably received therewithin, with a first actuator link fastener extending through said first leg tube and a second actuator link fastener directed through said second leg tube, with said first actuator link fastener and said second actuator link fastener engaging said central rod to permit telescoping of said central rod within said first leg tube and said second leg tube, and said second leg tube including a second leg tube axle mounted to said mounting flange pivotally mounting said actuator link to said mounting flange, and said first leg tube including a first tube axle pivotally mounting and engaging said lever plate.

3. An apparatus as set forth in claim 2 wherein said first leg tube includes a securement leg pivotally mounted thereto, with the securement leg including a securement leg first end and a securement leg second end, with the securement leg first end having a securement leg first end axle directed through said securement leg and said first leg tube adjacent said securement leg first end pivotally mounting said securement leg relative to said first leg tube, the securement leg including a securement leg handle mounted to said securement leg second end, with a row of engaging teeth extending along said securement leg between said securement leg first end and securement second end, and the lever plate including a lever plate engaging flange extending laterally and fixedly to said lever plate between said lever plate first end and said lever plate second end, with the engaging teeth arranged to engage and receive said engaging flange between a plurality /f said engaging teeth.

* * * * *